US009187975B2

(12) United States Patent
Rochen

(10) Patent No.: US 9,187,975 B2
(45) Date of Patent: Nov. 17, 2015

(54) FILAMENT WOUND COMPOSITE BALL

(71) Applicant: James Rochen, Houston, TX (US)

(72) Inventor: James Rochen, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 7 days.

(21) Appl. No.: 14/061,346

(22) Filed: Oct. 23, 2013

(65) Prior Publication Data

US 2014/0120346 A1  May 1, 2014

Related U.S. Application Data

(60) Provisional application No. 61/718,978, filed on Oct. 26, 2012.

(51) Int. Cl.
 E21B 33/12 (2006.01)
 B29C 53/76 (2006.01)
 B29D 99/00 (2010.01)

(52) U.S. Cl.
 CPC ............. *E21B 33/12* (2013.01); *B29C 53/76* (2013.01); *B29D 99/0042* (2013.01); *Y10T 428/2922* (2015.01)

(58) Field of Classification Search
 CPC .............................. B29C 53/76; E21B 34/14
 USPC .................... 156/170, 169, 172, 173
 See application file for complete search history.

(56) References Cited

U.S. PATENT DOCUMENTS

| 3,528,936 | A | 9/1970 | Kent et al. |
| 3,533,869 | A | 10/1970 | Ikeda et al. |
| 3,857,546 | A | 12/1974 | Quirk |
| 4,505,334 | A * | 3/1985 | Doner et al. ................. 156/170 |
| 5,485,882 | A | 1/1996 | Bailey et al. |
| 5,713,801 | A | 2/1998 | Aoyama |
| 7,350,582 | B2 | 4/2008 | McKeachnie et al. |
| 7,647,964 | B2 | 1/2010 | Akbar et al. |
| 8,127,856 | B1 | 3/2012 | Nish et al. |
| 8,403,037 | B2 | 3/2013 | Agrawal et al. |
| 8,528,633 | B2 | 9/2013 | Agrawal et al. |
| 2011/0132621 | A1 | 6/2011 | Agrawal et al. |
| 2012/0006562 | A1 | 1/2012 | Speer et al. |

(Continued)

FOREIGN PATENT DOCUMENTS

| WO | 2012/125196 A1 | 9/2012 |
| WO | 2013082219 A1 | 6/2013 |
| WO | WO-2013/082219 A1 * | 6/2013 |

OTHER PUBLICATIONS

Baker Hughes, "In-Tallic Disintigrating Frac Balls," copyright 2011.

(Continued)

*Primary Examiner* — Jeff Aftergut
(74) *Attorney, Agent, or Firm* — Blank Rome LLP

(57) ABSTRACT

A composite ball is formed with wound filament in a winding machine by winding the filament on a core, which can be permanent and form part of the finished ball. Alternatively, the core can be temporary. When winding is completed, the wound body is removed from the winding machine, an exterior of the wound body is finished, and the wound body is cured. When the core is permanent, at least a portion of the core is removed from the winding machine along with the wound body so any excess of the permanent core can be removed. The temporary core, however, is removed from the wound body, and the void is filled with filler material.

26 Claims, 5 Drawing Sheets

(56) References Cited

U.S. PATENT DOCUMENTS

| | | |
|---|---|---|
| 2012/0181032 A1 | 7/2012 | Naedler et al. |
| 2012/0234538 A1 | 9/2012 | Martin et al. |
| 2012/0273229 A1 | 11/2012 | Xu et al. |
| 2013/0098600 A1 | 4/2013 | Roberts |

OTHER PUBLICATIONS

Bruce Diamond Corp., "Frac Balls," obtained from http://www.brucediamond.com/products/fracking_frac_balls/, showing created date Dec. 8, 2012.
Halliburton, "Obsidian(R) Frac Plug," copyright 2010.
Team Oil Tools, "Team Oil Tools—Dissolvable Frac Ball," copyright 2012.
Weatherford, "FracGuard(R) 300 Series Composite Fracture Plugs," copyright 2004-2013.
Weatherford, "FracGuard(R) Micro Composite Plugs Series 300," copyright 2013.
Weatherford, "ZoneSelect(R) Completion System Stimulation Ball," copyright 2013.
Weatherford, "ZoneSelect(R) Completion System MultiShift Sliding Sleeve," copyright 2013.
DPX Enterprises, Inc., "Frac Ball Technical Summary," undated, showing created date Aug. 14, 2012.
Extended Search Report received in corresponding European Application No. 13190271.0, dated Jan. 23, 2014.
First Office Action in counterpart Canadian Appl. 2,831,122, mailed Apr. 22, 2015.
First Examination Report in counterpart Australian Appl. 2013248219, mailed Mar. 13, 2015.

* cited by examiner

FILAMENT WOUND COMPOSITE BALL

CROSS-REFERENCE TO RELATED APPLICATIONS

This application claims the benefit of U.S. Provisional Appl. 61/718,978, filed 26 Oct. 2012, which is incorporated herein by reference in its entirety and to which priority is claimed.

BACKGROUND OF THE DISCLOSURE

Balls are used in wellbores for a number of purposes. For example, balls may be deployed to operate various downhole tools, such as packers, cross-over tools, valves, etc. In a particular example, different-sized balls 10 as shown in FIG. 1 may be deployed to open sliding sleeves on a tubing string to perform treatment operations at various zones of the wellbore.

The balls 10 can be composed of a number of suitable materials 16 and may be subjected to various types of conditions (pressures, temperatures, fluid compositions, etc.). Aluminum balls are used in some applications, while composite balls are used in others. Some balls may even be composed of dissolvable materials so that the balls degrade in the wellbore environment overtime when exposed to temperatures, fluids, or other conditions.

In plug and perforation operations, a ball 10 is deployed downhole to close the fluid passage in a bridge plug so fracture treatment can be applied through perforations in casing. This can be repeated multiple times up the borehole as perforations are made in the casing and lower zones are sealed off by bridge plugs. Once operations are complete, all of the bridge plugs and balls 10 in the casing are milled out.

In a facture operation, balls 10 having successively increasing sizes are deployed downhole to actuate sliding sleeves on a tubing string. Thus, a smaller ball 12 is deployed downhole to open a sliding sleeve and close off fluid communication further downhole on the tubing string before a lager ball 14 is deployed to open another sliding sleeve further uphole. The configuration of ball sizes and seats ensures that a deployed ball 10 having a particular diameter engages a particular seat configured in one of the sliding sleeves so pressure applied behind the seated ball can open the sleeve.

With a ball 10 seated in the open sleeve, increased tubing pressure and treatment fluid are diverted out of the open sleeve to treat the surrounding zone in the wellbore. Once operations are complete, the multiple balls 10 in the sliding sleeves can be floated to the surface, and any balls 10 remaining downhole may be milled out.

As can be seen in both of the above examples, the balls 10 used downhole in some applications are preferably composed of a millable material, such as a composite material, which can be ground to pieces during milling operations. Yet, to operate properly, the composite balls need to withstand high fracture pressures and need to maintain their shape engaging the seats under such pressures. If the ball deforms or fails, then the fluid seal it provides with the seat will be compromised and make the fracture treatment ineffective.

As the industry progresses, higher pressures are being used downhole, and more and more treatment zones are being used downhole in a given wellbore. Existing composite fracturing ball technology is approaching a pressure and temperature limitation beyond which composite balls become less effective. Conventional manufacturing methods mold each ball from the desired material 16 or machine each ball to the appropriate form from a blank of the desired material 16. Both of these methods have limitations as to what strength the balls 10 can achieve.

The subject matter of the present disclosure is directed to overcoming, or at least reducing the effects of, one or more of the problems set forth above.

SUMMARY OF THE DISCLOSURE

Techniques according to the present disclosure form a composite ball with filament in a winding machine. A wound body for the ball is formed by winding the filament on a core in the winding machine. This core can be a permanent core that is expected to at least partially form part of the finished composite ball. Alternatively, the core can be a temporary core that is expected to be removed from the wound body when formed.

When winding is completed, the wound body is removed from the winding machine, an exterior of the wound body is finished, and the wound body is cured. Typically, the wound body is cured before finishing the ball's exterior by machining or the like, although any acceptable order of steps can be used depending on the implementation.

When the core is permanent, at least a portion of the permanent core is removed from the winding machine along with the wound body. Finishing the exterior of the wound body then involves at least partially removing any excess of the permanent core from the wound body. Because the permanent core forms part of the composite ball, it is preferably composed of a composite material, although any desirable material could be used for a given implementation.

When the core is temporary, manufacturing the ball involves removing the temporary core from the wound body, which leaves a void or hole in the wound body. Finishing the exterior of the wound body therefore involves filing the resulting void in the wound body with a filler material, which is preferably a composite material, although others can be used.

The filament wound ball offers higher shear strength due to the continuous fiber orientations formed in layers within the wound ball. Additionally, the filament wound material of the disclosed ball can have a high temperature rating based on the resin matrix (e.g., epoxy or phenolic) and the fiber material (e.g., e-glass or carbon fibers) used.

The foregoing summary is not intended to summarize each potential embodiment or every aspect of the present disclosure.

DETAILED DESCRIPTION OF THE DISCLOSURE

Figure 1:
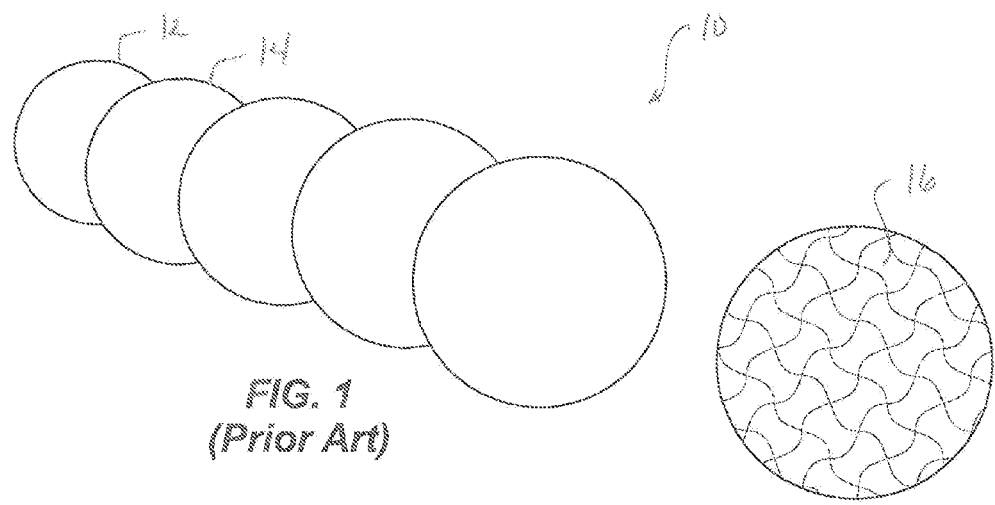
FIG. 1 illustrates composite balls used for stimulation, fracture, and other treatment operations in a wellbore.
Figure 2:
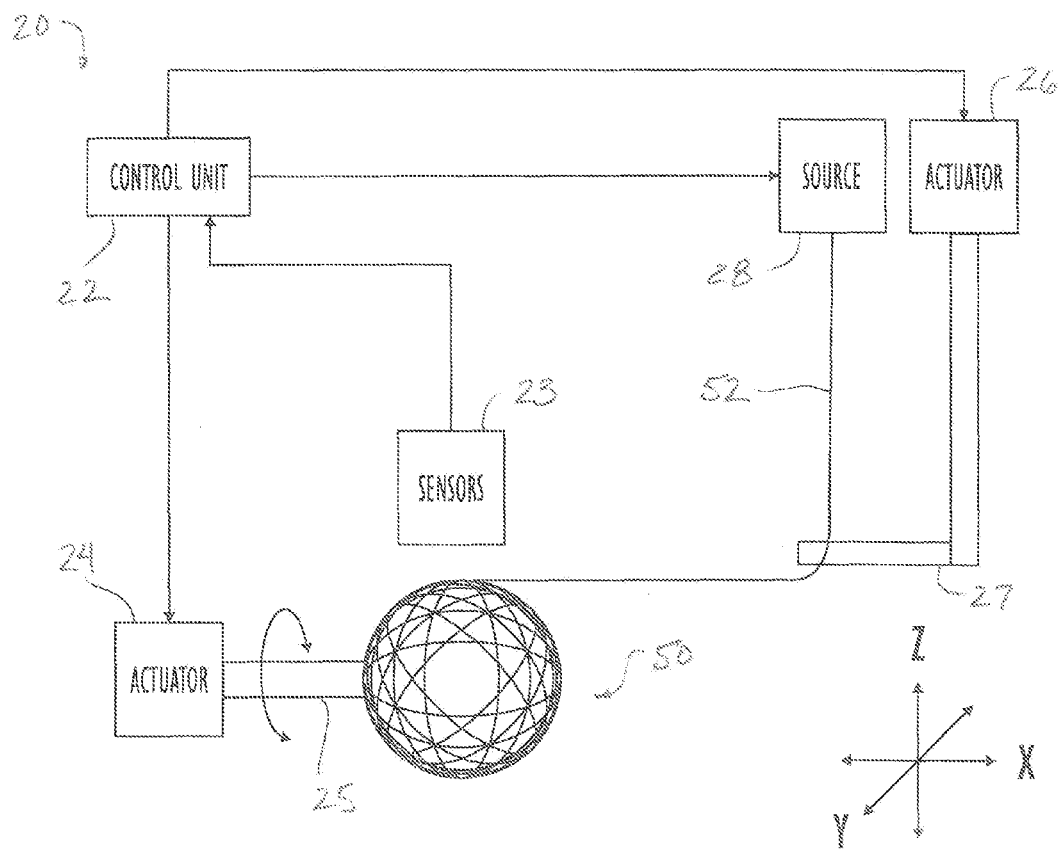
FIG. 2 schematically illustrates a system for winding a composite ball according to the present disclosure for use in downhole operations.

FIG. 2 schematically illustrates a system 20 for winding a composite ball 50 according to the present disclosure for use in downhole operations. The system 20 includes a multi-axis filament winding machine that is capable of articulating (i.e., rotating and translating) in multiple axes (e.g., 4 to 6 axes). As schematically shown, the system 20 includes a control unit 22 operatively coupled to one or more actuators—only two actuators 24 and 26 are shown for simplicity. The actuators 24 and 26 can be linear and rotational actuators. The control unit 22 controls the actuators 24 and 26 to control the winding of filament 52 from a filament source 28 to form the composite ball 50 during a filament winding procedure.

As shown here, a first actuator 24 has a spindle 25 on which the composite ball 50 is formed, and the first actuator 24 may be capable of articulating the spindle 25 in a number of suitable ways while forming the composite ball 50. A second actuator 26 has a payout head 27 for guiding the filament 52 from the source 28 for forming the composite ball 50. The second actuator 26 may be capable of articulating the payout head 27 and control the resulting placement of the filament 52 in a number of ways to form the composite ball 50.

The control unit 22 uses computerized numerical control to operate the various linear and rotational actuators 24 and 26 to wind the filament 52. The control unit 22 may further include various types of sensors 23, such as optical sensors, to monitor the winding of the filament 52 on the spindle 25 to form the composite ball 50. As will be appreciated, the winding machine of the system 20 has any number of rollers, tensioners, spools, and other components (not shown) that are used for delivering the filament 52, controlling its placement, and performing the winding procedures according to the purposes herein. Additionally, the system 20 has various components for handling and applying resin to the filament 52, the wound body 54, or both during the winding procedure. These features will be readily appreciated by one skilled in the art having the benefit of the present disclosure.

Figure 3:
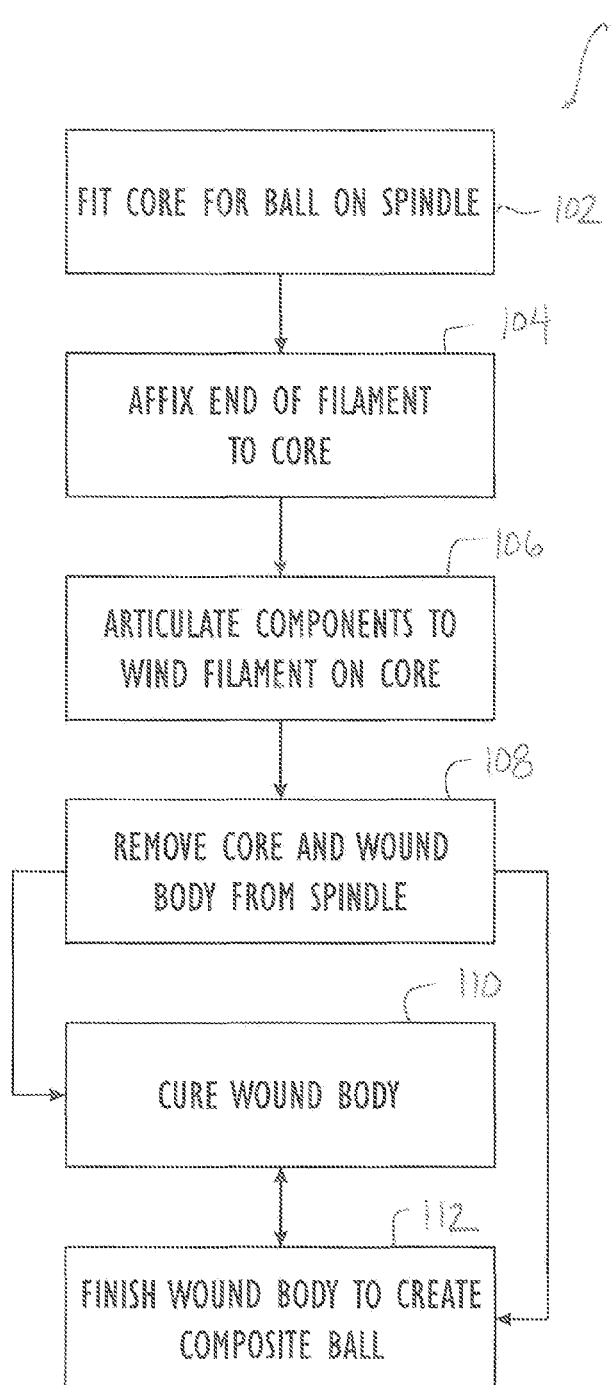
FIG. 3 illustrates a process for winding the composite ball according to the present disclosure.

Turning now to FIG. 3, a process 100 is shown for winding the composite wound ball 50 from filament 52 according to the present disclosure. Referring concurrently to the system 20 of FIG. 2, the process 100 begins by positioning a core for forming the ball 50 in the winding machine of the system 20 (Block 102). As described in more detail later, the core is affixed to the spindle 25 of the winding machine and can be a permanent structure or a temporary structure for the composite wound ball 50. To start the winding of the filament 52 to the core, the end of the filament 52 is affixed to a portion of the core so the length of the filament 52 can be wound about the core to form the ball 50 (Block 104). Initially affixing the filament 52 to the core can be performed in a number of ways including, mechanically fastening, tying, wrapping, etc. the filament 52 to the core.

The system 20 then articulates the components of the winding machine to wind the filament 52 on the core to create the composite ball 50 (Block 106). As will be appreciated, the filament 52 can be placed in a number of suitable patterns to enhance the strength of the formed ball 50. These patterns can be randomized or predetermined depending on the desired results. Overall, the filament 52 is wound in overlapping layers around the forming ball 50, and the overlapping layers are preferably arranged in offset directions or angles so that the windings of the filament 52 lie in different directions from one layer to the other.

Once the formed ball 50 reaches a suitable size, the formed ball 50 and core can be removed from the machine (Block 108). At this point, a number of finishing steps can be preformed to prepare the formed ball 50 for use. For example, the composite wound ball 50 may be cured and otherwise treated to harden and complete the ball 50 (Block 110). Also, the outer dimension and surface of the formed ball 50 may be finished by machining, filling, and the like (Block 112) so that the ball 50 achieves the desired shape (e.g., spherical), uniformity, surface finish, dimensions, etc.

The particular order in which these finishing steps (Blocks 110 & 112) are preformed may depend on the winding process. In general, the wound body 54 of the ball 50 is cured before the ball 50 is machined to a particular shape, dimension, or the like. Additionally, any holes or voids in the wound body of the ball 50 may be filled before the ball 50 is cured and subsequently machined. These and other considerations will be appreciated with the benefit of the present disclosure.

In the winding steps of Block 106, the ball 50 is formed on a permanent core or a temporary core, which are used for starting the formation of the ball 50. (Further details related to permanent and temporary cores are discussed later.) Forming the ball 50 on the core involves a filament winding process suitable for downhole applications. A particularly useful filament winding process disclosed in U.S. Pat. No. 6,712,153 has been used to create composite wound plugs for downhole use. Such a filament winding process can be used in a similar fashion in winding the composite wound ball 50 of the present disclosure. Accordingly, composition of the ball 50 can use a comparable filament 52. As such, the composite wound ball 50 can be composed of a polymeric composite reinforced by a continuous fiber such as glass, carbon, or aramid; however, the process is not limited to these examples and could be formed using other compositions.

In fact, the filament 52 may comprise a dissolvable material and/or the resin matrix may comprise a dissolvable material. Reference herein to dissolvable material is meant to encompass any materials designed to dissolve, erode, disintegrate, or otherwise degrade in certain wellbore conditions due to heat, temperature, hydrocarbon composition, introduced solvent, applied acid, or other factors. By having "dissolvable material", the physical properties of the composite ball 50 are generally degraded to a point where the ball no longer function as intended—e.g., can no longer maintain a seal or remain seated. The dissolvable material can be formed into strands or filament 52 that is wound to form the composite wound ball 50 according to the techniques disclosed herein. As an addition or as an alternative to the use of filament 52 composed of dissolvable material, the matrix for binding the filaments 52 (of dissolvable material or not) can be composed of dissolvable material. Generally speaking, the dissolvable materials can include one or more of polystyrenes, elastomers, resins, adhesives, polyesters, polymides, thermoplastic polymers, and thermosetting polymers to name just a few.

In the winding process, the filament 52 of the composite material is wound layer upon interlaced layer around the core. Each individual layer is preferably wound at an angle relative to the previous layer to provide additional strength and stiffness to the composite material in high temperature and pressure downhole conditions.

The polymeric composite preferably uses an epoxy blend. However, the polymeric composite may also consist of polyurethanes or phenolics, for example. In one aspect, the polymeric composite uses a blend of two or more epoxy resins.

For example, the composite can be a blend of a first epoxy resin of bisphenol A and epichlorohydrin and a second cycoaliphatic epoxy resin.

The filament 52 is typically wet wound, being impregnated with the matrix material (e.g., resin) before winding. However, dry winding can be used in which a pre-preg roving process forms a matrix. As is known, pre-preg refers to fiber or filament pre-impregnated with a matrix material, such as a bonding agent, resin, epoxy, etc. Although less desirable, the filament 52 can be wound dry to form the wound body or at least a portion thereof, and the body or portion thereof can be subsequently impregnated with the matrix material (e.g., resin). This can be performed in stages. As will be appreciated, particular handling and curing procedures for the filament 52 will be required depending on how the filament 52 is wound (wet, pre-preg, dry, etc.).

In the curing steps (i.e., Block 110), a post-cure process may be used to achieve greater strength of the material. Typically, the post-cure process is a two-stage cure consisting of a gel period and a cross-linking period using an anhydride hardener. Heat is added during the curing process to provide the appropriate reaction energy to drive the cross-linking of the matrix to completion. The composite may also be exposed to ultraviolet light or a high-intensity electron beam to perform the reaction energy to cure the composite material.

Figure 4:
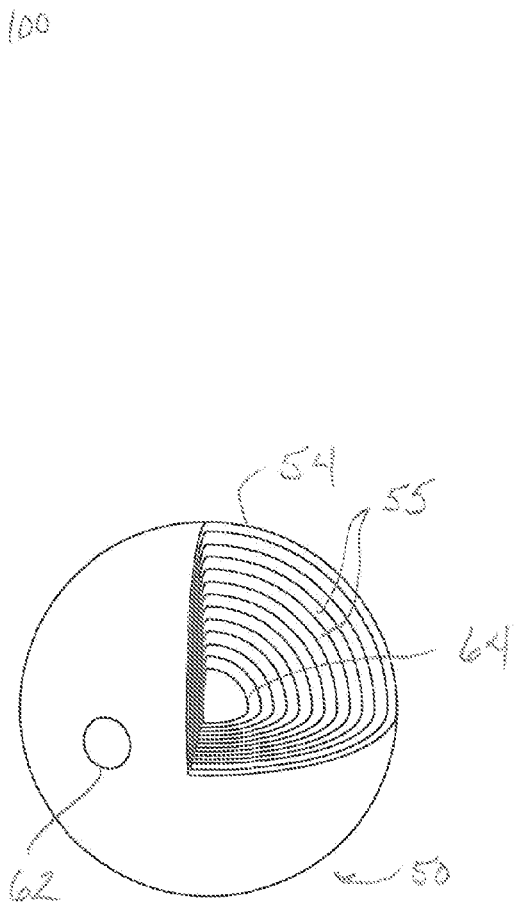
FIG. 4 illustrates a filament wound composite ball in a schematic cutaway view.

As an example of a formed ball, FIG. 4 schematically illustrates a filament wound composite ball 50 in a partial cutaway view. As shown, the wound body 54 of the ball 50 has the wound filament formed in successively increasing layers 55. Although the layers 55 are illustrated here as being distinctly laid one on the other for illustrative purposes, the layers 55 of the filament winding would in reality be interlaced so that the layers 55 are formed and wrapped in an interrelated way together. The filament in the layers 55 can be oriented in a different orientation relative to the adjacent layers 55. Additionally, the filament in a given layer 55 can wrap around the diameter of the windings in a number of configurations or patterns.

The differences in orientation and configuration of the filament in the layers 55 can be arranged in any desirable pattern and are preferably arranged to increase the overall strength of the formed ball 50. Also visible in this partial cutaway, an inner portion 62 of the core forms an interior portion of the composite ball 50, and an outer portion 64 of the core may be exposed at the ball's surface.

As already mentioned above, the composite wound ball 50 is formed by winding filament 52 on a core. FIGS. 5A-5D illustrate one configuration of a core 60a for winding a composite ball 50 according to the present disclosure. As shown here, the winding 54 of the ball 50 is formed over a permanent core 60a, which is preferably composed of composite material although other materials can be used. In general, the core 60a can have one end 62 to affix to the system's spindle 25 with threads or the like.

The core 60a can also have another end 64 on which the winding 54 is formed. This end 64 can have any suitable contour, shape, size, or the like to facilitate the winding process. As shown here, the end 64 can be bulbous. Eyelets, catches, grooves, or other features can also be provided.

The composite core 60a can be molded, extruded, or wound from composite material. As shown, the core 60a can be solid, but it could also be hollow. The size of the core 60a may be small in comparison to the winding 54 so that more of the completed ball 50 is composed of wound filament, although other size variations can be used. Therefore, the dimensions (e.g., diameter of the core 60a, its length, dimension of its end 64, and the like) in FIGS. 5A-5D are meant to be exemplary and may differ in a given implementation.

Figure 5A:
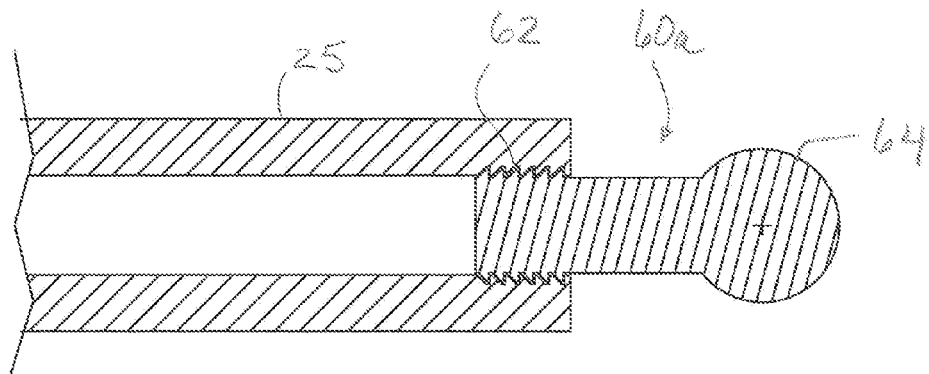
FIGS. 5A-5D illustrate one configuration for winding a composite ball according to the present disclosure.
Figure 5B:
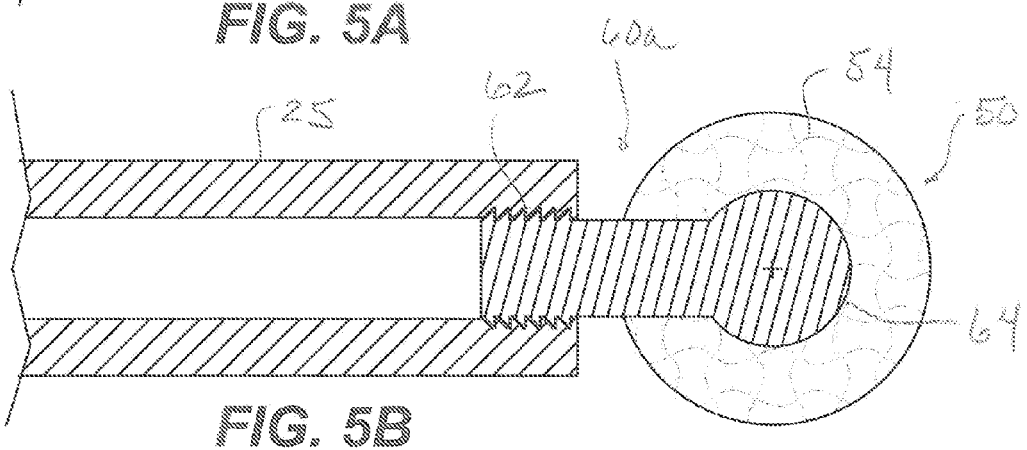
Figure 5C:
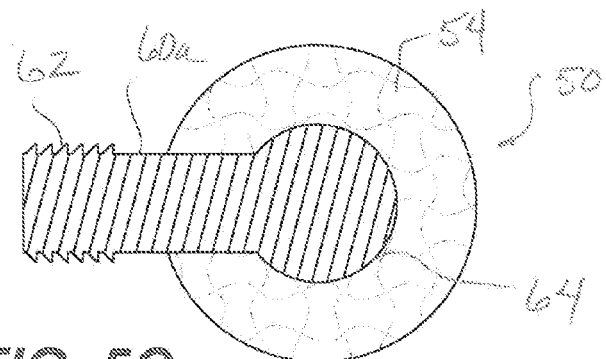
Figure 5D:
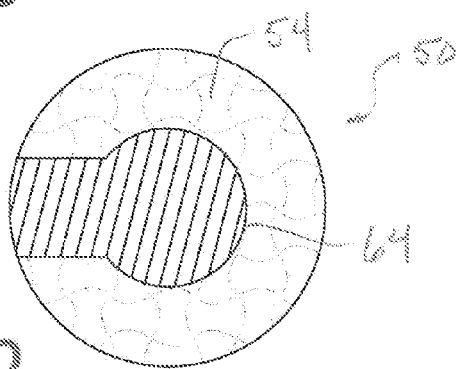

As shown in FIGS. 5B-5D, the core 60a with the formed winding 54 can be removed from the spindle 25 at the appropriate point in the winding process. The core 60a can be unthreaded from the spindle 25, or portion of the core 60a can be cut off from the spindle 25. The excess of the core 60a can be ground flush to the winding 54 to give the ball its desired shape.

Rather than a permanent core 60a as above, another configuration illustrated in FIGS. 6A-6D allows for winding the composite ball on a temporary core 60b. In similar fashion as before, the temporary core 60b can have one end 62 to affix to the system's spindle 25 with threads or the like. The core 60b can also have another end 64 on which the winding 54 is formed. This end 64 can have any suitable contour, shape, size, or the like to facilitate the winding process. As shown here, the end 64 is shaped so that the core 60b can be removed from the formed winding 54 during later steps. Eyelets, catches, grooves, or other features can also be provided on the core's end 64.

The core 60b can be composed of any suitable material, such as metal or the like. The size of the core 60a may be small in comparison to the winding 54 so that more of the completed ball 50 is composed of wound filament. Additionally, the core 60b need not be a singular component, but instead can comprise several components that allow the core 60b to be decreased in dimension to facilitate its removal.

Figure 6A:
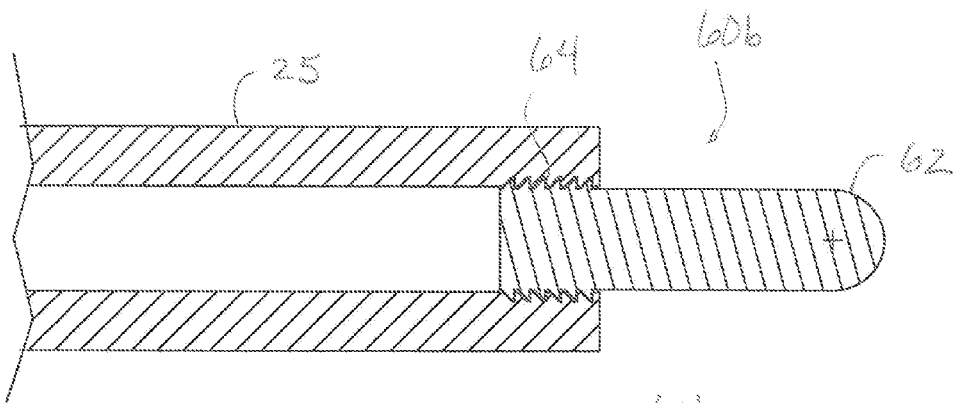
FIGS. 6A-6D illustrate another configuration for winding a composite ball according to the present disclosure.
Figure 6B:
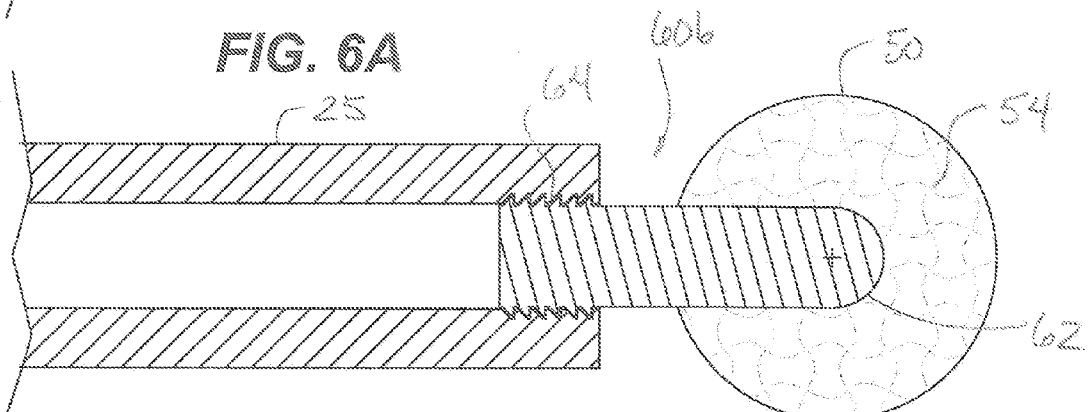
Figure 6C:
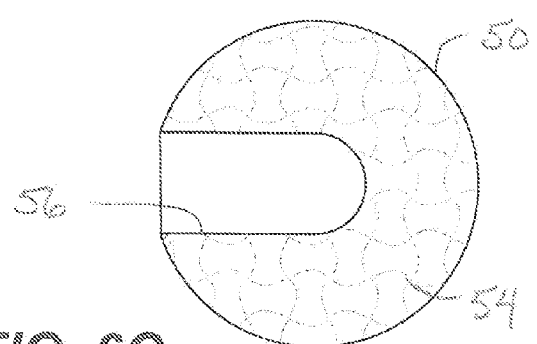
Figure 6D:
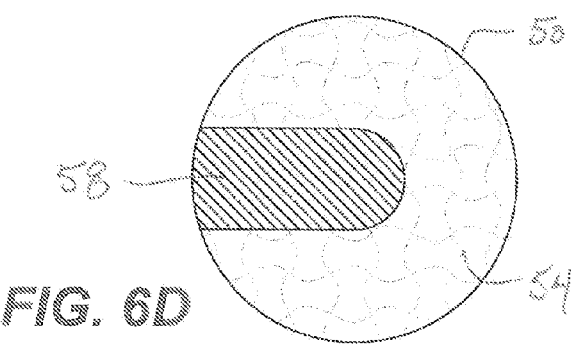

As shown in FIGS. 6B-6D, the temporary core 60b with the formed winding 54 can be removed from the spindle 25 at the appropriate point in the winding process. The core 60b can then be removed from the winding 54, which leaves a void or pocket 56. In final steps, the pocket 56 can be filled by an epoxy, composite, or other filler material and can be ground flush with the winding 54 to form the desired shape of the ball 50. Advantageously, the pocket 56 can allow the ball 50 to be filed with sensing elements, such as magnetic material, RFID tags, etc., for later use when the ball 50 is deployed downhole.

In addition to the above configurations, the winding process can use a combination of a permanent core fit onto a temporary core so that the benefits of both configurations can be realized in the winding process of a composite ball 50. In this instance, the winding can be formed primarily on the permanent core extending from the temporary core. When winding is completed, the temporary core can be removed from the resulting winding 54 and the permanent core so that a smaller void remains to be filled.

Figure 7:
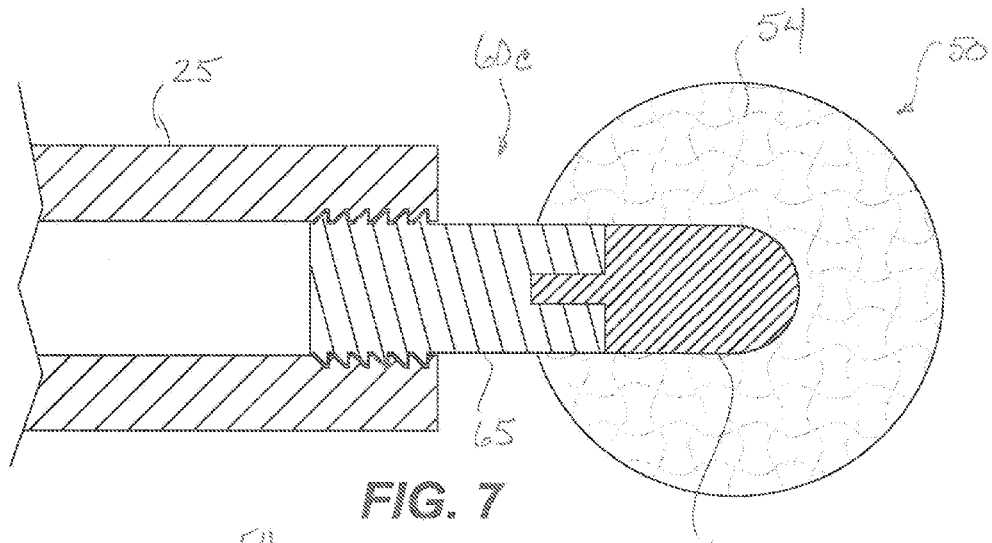
FIG. 7 illustrates yet another configuration for winding a composite ball according to the present disclosure.

For example, FIG. 7 shows another configuration for forming a composite ball 50. Here, the core 60c includes two core components 63 and 65. A first, distal core component 63 is a permanent core and can be composed of a composite material. A second core component 65 is a temporary core and can be composed of any suitable material. The permanent component 63 can affix to the temporary component 65 using any suitable technique. For its part, the temporary component 65 can actually be part of (and integral to) the spindle 25.

To form the composite ball 50, the core 60c is disposed on the spindle 25, and the winding process winds the filament as before. When the winding is complete, the wound body 54 and at least a portion of the core 60c can be removed from the spindle 25. The temporary component 65 can then be removed from the formed winding 54, leaving the permanent component 63 as an integral part of the ball 50. The resulting void 56, which is less extensive than before, can be filled with filler material.

Figure 8:
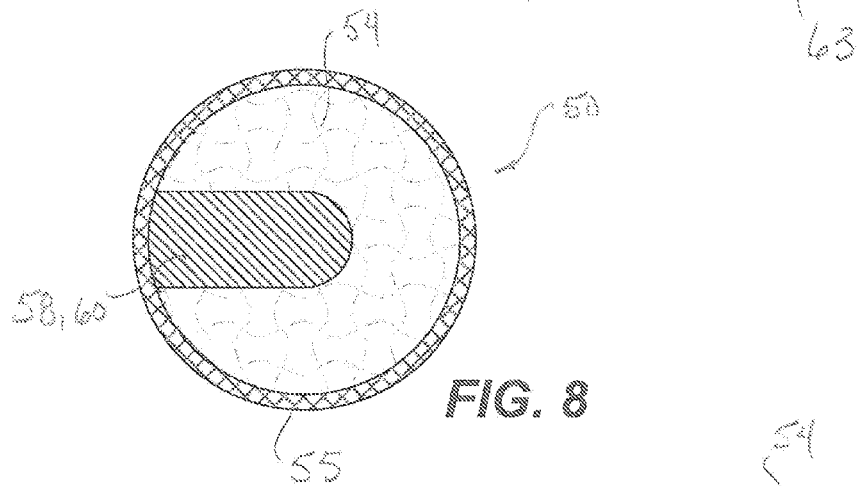
FIG. 8 illustrates a cross-sectional view of an alternative finished composite wound ball of the present disclosure.

In addition to the finishing steps described previously, part of the finishing steps can involve applying a molded outside shell, coating, or exterior to the wound body 54 of the composite wound ball 50. As shown in FIG. 8, for example, the wound body 54 and filled or permanent core 58, 60 has an external shell, coating, or exterior 55 molded, applied, or formed thereabout. The shell 55 can be composed of similar or different material than other portions of the ball 50, as desired for a particular implementation.

For example, the shell 55 can be composed of a protective material. Alternatively, the shell 55 can be composed of a beakable or dissolvable material that may be different than any material (dissolvable or not) used for the wound body 54. Being able to configure the shell 55 with different properties than the wound body 54 can be used for a number of purposes downhole. For instance, the wound body 54 may be composed of filament of dissolvable material. The external shell 55 may be a protective coating that protects the wound body 54 from environmental conditions until the composite ball 50 is deployed in a wellbore and subjected to the wellbore environment. Eventually, the coating of the shell 55 may break, erode, dissolve or the like so that the wound body 54 can be exposed to certain wellbore conditions that begin to dissolve the body 54.

Figure 9:
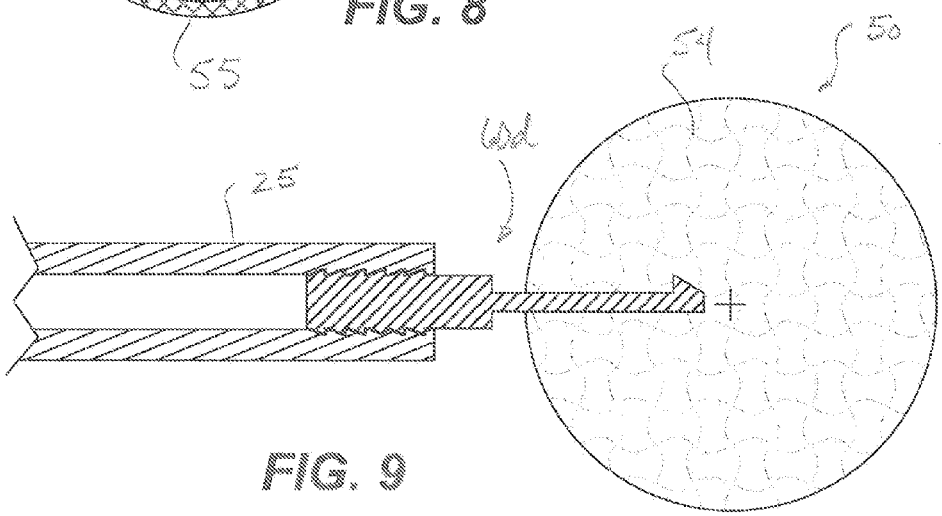
FIG. 9 illustrates an alternative example of a core and winding for forming a composite wound ball according to the present disclosure.

As noted previously, the core 60 can have any number of configurations, shapes, etc. As one alternative example, FIG. 9 shows a core 60*d* in the form of a needle or pin, which can be composed of any suitable material. The distal end of the core 60*d* can have a hook, a catch, an eyelet, or other feature where the winding of the filament can begin. Notably, the core 60*d* does not necessarily extend to the eventual center C of the formed ball 50. Instead, through the process of winding and forming, the ball's body 54 is formed to have its center C positioned off from the end of the core 60*d*. This can allow the wound body 54 to be formed from more windings of filament, which may increase the overall strength of the resulting ball 50.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of forming a composite ball with filament in a winding machine, comprising not necessarily in order:
   forming a wound body by winding the filament on a core in the winding machine, the core having at least a core portion to be removed from the wound body;
   removing the wound body from the winding machine;
   curing the wound body; and
   finishing an exterior of the wound body by filling a void resulting in the wound body from removal of the core portion from the wound body or removing excess of the core portion left outside the wound body.

2. The method of claim 1, wherein removing the wound body from the winding machine comprises removing the wound body and at least a permanent core portion of the core from the winding machine.

3. The method of claim 1, wherein forming the wound body by winding the filament on the core in the winding machine comprises one or more of:
   articulating the filament relative to the core about a plurality of axes;
   wet winding the filament around the core;
   winding the filament in one or more patterns around the core;
   wet winding the filament coated in a matrix material; and
   winding the filament pre-impregnated with a matrix material.

4. The method of claim 1, wherein finishing the exterior of the wound body comprises machining the exterior of the wound body.

5. The method of claim 1, wherein curing the wound body comprises heating the wound body.

6. A method of forming a composite ball with filament in a winding machine, comprising not necessarily in order:
   forming a wound body by winding the filament on a core in the winding machine, wherein the core comprises a permanent core;
   removing the wound body from the winding machine;
   curing the wound body; and
   finishing an exterior of the wound body by removing excess of the permanent core from the exterior of the wound body.

7. The method of claim 6, wherein the permanent core is composed of a composite material.

8. A method of forming a composite ball with filament in a winding machine, comprising not necessarily in order:
   forming a wound body by winding the filament on a core in the winding machine, wherein the core comprises a temporary core;
   removing the wound body from the winding machine;
   curing the wound body; and
   finishing an exterior of the wound body by removing the temporary core from the wound body and filling a remaining void of the wound body with a filler material.

9. The method of claim 8, wherein the filler material is composed of a composite material.

10. A method of forming a composite ball with filament in a winding machine, comprising not necessarily in order:
    forming a wound body by winding the filament on a core in the winding machine;
    removing the wound body from the winding machine;
    removing the wound body from the core;
    curing the wound body; and
    finishing an exterior of the wound body.

11. The method of claim 10, wherein finishing the exterior of the wound body comprises filing a resulting void in the wound body with a filler material.

12. A method of forming a composite ball with filament in a winding machine, comprising not necessarily in order:
    forming a wound body by winding the filament on a core in the winding machine, wherein the core comprises a temporary core portion and a permanent core portion;
    removing the wound body from the winding machine;
    curing the wound body; and
    finishing an exterior of the wound body by removing the temporary core portion from the wound body and the permanent core portion and filling a remaining void of the wound body with a filler material.

13. The method of claim 12, wherein the filler material is composed of a composite material, and wherein the permanent core portion is composed of a composite material.

14. A composite ball formed with filament in a winding machine by a method, comprising not necessarily in order:

forming a wound body by winding the filament on a core in the winding machine, the core having at least a core portion to be removed from the wound body;

removing the wound body from the winding machine;

curing the wound body; and finishing an exterior of the wound body by filling a void resulting in the wound body from removal of the core portion from the wound body or removing excess of the core portion left outside the wound body.

15. The composite ball of claim 14, wherein removing the wound body from the winding machine comprises removing the wound body and at least a portion of the core from the winding machine.

16. The composite ball of claim 14, wherein forming the wound body by winding the filament on the core in the winding machine comprises one or more of:

articulating the filament relative to the core about a plurality of axes;

wet winding the filament around the core;

winding the filament in one or more patterns around the core;

wet winding the filament coated in a matrix material; and winding the filament pre-impregnated with a matrix material.

17. The composite ball of claim 14, wherein finishing the exterior of the wound body comprises machining the exterior of the wound body.

18. The composite ball of claim 14, wherein curing the wound body comprises heating the wound body.

19. A method of forming a composite ball with filament in a winding machine, comprising not necessarily in order:

forming a wound body by winding the filament on a permanent core in the winding machine;

removing the wound body and at least a portion of the permanent core from the winding machine;

curing the wound body; and finishing an exterior of the wound body by at least partially removing excess of the permanent core.

20. The method of claim 19, wherein the permanent core is composed of a composite material.

21. A method of forming a composite ball with filament in a winding machine, comprising not necessarily in order:

forming a wound body by winding the filament on a temporary core in the winding machine;

removing the wound body from the temporary core;

curing the wound body; and finishing an exterior of the wound body by filing a resulting void in the wound body from the removed temporary core.

22. The method of claim 21, wherein filling the resulting void comprises filling with a filler material composed of a composite material.

23. A composite ball formed with filament in a winding machine by a method, comprising not necessarily in order:

forming a wound body by winding the filament on a permanent core in the winding machine;

removing the wound body and at least a portion of the permanent core from the winding machine;

curing the wound body; and finishing an exterior of the wound body by at least partially removing excess of the permanent core.

24. The composite ball of claim 23, wherein the permanent core is composed of a composite material.

25. A composite ball formed with filament in a winding machine by a method, comprising not necessarily in order:

forming a wound body by winding the filament on a temporary core in the winding machine;

removing the wound body from the temporary core;

curing the wound body; and finishing an exterior of the wound body by filing a resulting void in the wound body from the removed temporary core.

26. The composite ball of claim 25, wherein filing the resulting void comprises filling with a filler material composed of a composite material.

* * * * *